United States Patent
Ruf

(10) Patent No.: US 8,974,108 B2
(45) Date of Patent: Mar. 10, 2015

(54) TRUCK MIXER

(75) Inventor: Berthold Ruf, Schoeneburg (DE)

(73) Assignee: Liebherr-Mischtechnik GmbH, Bad Schussenried (DE)

( * ) Notice: Subject to any disclaimer, the term of this patent is extended or adjusted under 35 U.S.C. 154(b) by 1156 days.

(21) Appl. No.: 12/943,583

(22) Filed: Nov. 10, 2010

(65) Prior Publication Data

US 2011/0116338 A1 May 19, 2011

(30) Foreign Application Priority Data

Nov. 12, 2009 (DE) .................... 20 2009 015 406 U

(51) Int. Cl.
*B28C 5/18* (2006.01)
*B28C 5/42* (2006.01)
*B60P 3/16* (2006.01)
*B62D 27/04* (2006.01)
*B62D 27/06* (2006.01)

(52) U.S. Cl.
CPC ................ *B28C 5/4265* (2013.01); *B60P 3/16* (2013.01); *B62D 27/04* (2013.01); *B62D 27/065* (2013.01)
USPC .......................................................... 366/62

(58) Field of Classification Search
USPC ......................................... 366/53–63, 79–90
See application file for complete search history.

(56) References Cited

U.S. PATENT DOCUMENTS

| 1,662,274 A * | 3/1928 | Koehring ........................ 366/39 |
| 1,758,732 A * | 5/1930 | Burn et al. ...................... 366/63 |
| 1,766,582 A * | 6/1930 | Ball ................................ 366/63 |
| 1,778,837 A | 10/1930 | Schmitt |
| 1,828,181 A * | 10/1931 | Gillespie ......................... 366/63 |
| 2,350,285 A * | 5/1944 | Maxon, Jr. ....................... 366/63 |
| 2,477,568 A * | 8/1949 | Beckwith ........................ 366/29 |
| 2,497,736 A * | 2/1950 | Muller ............................ 366/60 |
| 2,511,240 A * | 6/1950 | Bohmer et al. ................. 366/60 |
| 2,678,198 A * | 5/1954 | Hilkemeier ..................... 366/63 |
| 2,722,408 A * | 11/1955 | Hilkemeier ..................... 366/63 |
| 2,753,163 A * | 7/1956 | Hilkemeier ..................... 366/63 |
| 2,838,291 A * | 6/1958 | Peebles .......................... 366/47 |
| 3,785,622 A * | 1/1974 | Johnson .......................... 366/63 |
| 3,825,232 A * | 7/1974 | Pecorari ......................... 366/62 |
| 4,273,000 A * | 6/1981 | Schmid .......................... 476/66 |
| 4,575,254 A * | 3/1986 | Johnston ......................... 366/62 |
| 4,624,576 A * | 11/1986 | Dillman ......................... 366/63 |
| 7,845,843 B2 * | 12/2010 | Heilig ............................ 366/62 |
| 7,878,699 B2 * | 2/2011 | Schiffner et al. ............... 366/62 |
| 2008/0291772 A1* | 11/2008 | Mollhagen ..................... 366/63 |
| 2010/0246314 A1* | 9/2010 | Ruf ................................ 366/63 |
| 2011/0116338 A1* | 5/2011 | Ruf ................................ 366/62 |

FOREIGN PATENT DOCUMENTS

| CN | 201 124 538 Y | 10/2008 |
| DE | 29 30 695 A1 | 2/1981 |
| GB | 308006 | 3/1929 |

(Continued)

*Primary Examiner* — Tony G Soohoo
(74) *Attorney, Agent, or Firm* — Dilworth & Barrese, LLP.

(57) ABSTRACT

The present invention relates to a truck mixer having a chassis, a mixer subframe arranged on the chassis and a mixer drum which is arranged over a front drum support and a rear drum support on the mixer subframe, wherein at least the rear drum support is fastened on side members of the mixer subframe via elastic, shape-matched connections, wherein at least one of the connections for the fastening of the rear drum support to a side member of the mixer subframe has a connection arrangement for the shape-matched elastic connection which is arranged within the section width of the side member.

17 Claims, 5 Drawing Sheets

(56) References Cited

FOREIGN PATENT DOCUMENTS

| GB | 677 938 A | 8/1952 |
| GB | 927200 | 5/1963 |
| RU | 1770199 A1 | 10/1992 |
| RU | 1785964 A1 | 1/1993 |
| RU | 2097221 C1 | 11/1997 |

* cited by examiner

TRUCK MIXER

BACKGROUND OF THE INVENTION

The present invention relates to a truck mixer having a chassis, a mixer subframe arranged on the chassis and a mixer drum which is arranged over a front drum support and a rear drum support on the mixer subframe. In this respect, at least the rear drum support is fastened to side members of the mixer subframe via elastic, shaped-matched connections.

Truck mixers were first used in which the drum supports are fixedly connected to the mixer subframe. A fixed introduction of force was thus realized in all directions. However, strains and cracks occurred in the connection welds due to deformations in the chassis of the carrier vehicle.

It has therefore become usual to fasten drum supports on the mixer subframe via elastic connections. A molded body is usually provided in this respect which is fixedly welded to the drum support and at which said drum support lies in a counterpiece which is externally welded to the mixer subframe. The drum support is fixed in its position with respect to the mixer subframe in a shape-matched manner with this molded body. A strap bolt is furthermore provided which engages around the drum support and the counterpiece at the mixer subframe and so braces the drum support and the subframe with respect to one another.

Such an elastic, shape-matched connection is insensitive to lower relative movements which can arise between the drum support and the frame. The known constructions with a counterpiece welded to the outside of the side members of the mixer subframe, however, have disadvantages both with respect to the construction space and with respect to the introduction of force.

SUMMARY OF THE INVENTION

It is therefore the object of the present invention to provide a truck mixer having an improved elastic shaped-matched connection of the rear drum support.

This object is achieved in accordance with the invention by a truck mixer in accordance with the description herein. The truck mixer in accordance with the invention in this respect includes a chassis, a mixer subframe arranged on the chassis and a mixer drum which is arranged on the mixer subframe via a front drum support and a rear drum support. In this respect, at least the rear drum support is fastened on side members of the mixer subframe via elastic, shape-matched connections. Provision is made in this respect in accordance with the invention that at least one of the connections for the fastening of the rear drum support on a side member of the mixer subframe has a connection arrangement for the shape-matched elastic connection which is arranged within the section width of the side member.

This has the advantage, on the one hand, of an improved introduction of force into the mixer subframe since the connection arrangement is arranged within the section width of the side member so that the connection forces are introduced directly into the side member. The torsional moment which is introduced into the side members is hereby reduced.

In addition, the construction space requirements are substantially reduced. In the connection arrangement in accordance with the invention, the outer dimensions of the drum support must in particular only project outwardly beyond the subframe of the truck mixer a little or not at all. The connection arrangement or the drum support thus no longer comes into conflict with parts of the axle unit. In addition, fenders or fastening panels can be arranged in the region beside the side members.

The side member of the subframe advantageously has a section width constant in the lengthways direction. The side member of the subframe in this respect in particular includes a section element extending in the lengthways direction. Provision is made in this respect in accordance with the invention that the connection arrangement is arranged within the section width of this section element. The side member can in this respect e.g. have a U section and/or a box section. The side member can in this respect in particular include a U section element which is closed to form a box section at least in the region of the rear drum support with sheet metal strips. It is in particular a cold-formed U section element in this respect.

Further advantageously, provision is made in accordance with the invention that the connection arrangement is arranged substantially centrally within the section width of the side member. A particularly good introduction of force hereby results by which only a small torsional moment or no torsional moment at all is exerted onto the side member.

Further advantageously, provision is made in accordance with the invention that the rear drum support lies on the side member over a support surface arranged within the section width of the side member. The support surface is in this respect in particular arranged on the upper side of the side member. A direct introduction of the force of the weight in turn results from the drum support into the side member. The bending stress of the fastening plates at which the mixer subframe is welded to the chassis is hereby reduced. Due to the arrangement of the support surface on the upper side of the side member, its total section can be used for the reception of these forces. Further advantageously, provision is made in this respect that the connection arrangement is arranged in the region of the support surface. The support surface is in this respect in particular integrated into the connection arrangement. Provision can in particular be made in this respect that the support surface surrounds a connection element for the establishing of a shape-matched connection at least at two sides.

The connection arrangement in accordance with the invention in this respect fixes the drum support at least in one direction by a shape-matched connection at the side member of the mixer subframe. However, the connection arrangement advantageously fixes the drum support on the side member by a shape-matched connection both in the transverse direction and in the lengthways direction. Further advantageously, the connection arrangement also fixes the drum support by a shape-matched connection in the vertical direction on the side member.

The elasticity of the connection in this respect advantageously results in that a connection element is provided which establishes the shape-matched connection and forms a separate element with respect to the drum support and/or to the side member. The connection arrangement is in this respect designed such that it does not establish any shape-matched connection with respect to rotational movements about a vertical axis of rotation. The connection arrangement is hereby relatively insensitive with respect to twists of the mixer subframe. Provision can furthermore be made that the shape-matched connection has a certain play to improve the elasticity of the connection.

Provision is further advantageously made that at least one support surface is made spherical at the drum support and/or at the connection arrangement. No additional stress forces hereby result due to angular movements between the subframe and the drum support either. Stress peaks due to edge pressure can in particular be avoided.

Provision is further advantageously made that the connection arrangement includes a cut-out, in particular a bore in the drum support through which a connection element fixed to the side member in the lengthways or breadthways direction passes. The connection element which engages into the cut-out at the drum support thus establishes a shape-matched connection between the drum support and the side member in the lengthways and breadthways directions. The cut-out or bore is in this respect in particular arranged in a cross member of the drum support.

Provision is further advantageously made in this respect that the part of the connection element passing through the cut-out is arranged within the section width of the side member, in particular substantially centrally within the section width of the side member. Transverse forces and longitudinal forces are also hereby centrally introduced into the side member.

Provision is furthermore advantageously made that the connection arrangement includes a bracing arrangement via which the rear drum support is braced with the side member. The bracing thus provides a secure and nevertheless elastic fixing of the drum support at the side member. The bracing in this respect advantageously takes place by a screw connection. In this respect, both the screw and the nut are advantageously made as elements separate from the side member and/or from the drum support.

Provision is further advantageously made that the connection element, which passes through a cut-out in the drum support and thus establishes a shape-matched connection in the lengthways direction and/or breadthways direction, is simultaneously part of the bracing arrangement. For this purpose, the connection element is advantageously fixed to the side member in the vertical direction.

Provision is further advantageously made that the bracing arrangement includes a clamping bolt, in particular a stress bolt or a headless bolt. The clamping bolt is in particular a bolt which only has one single screw axis and not a strap bolt. Provision is advantageously made that the clamping bolt passes through the section of a cross member of the drum support. Provision is further advantageously made that the screw connection axis of the clamping bolt is arranged within the section width of the side member.

Provision is further advantageously made in accordance with the invention that the connection arrangement is arranged on the upper side of the section of the side member. The connection arrangement can hereby be mounted particularly easily on the subframe. Provision is in particular made in this respect that parts of the connection arrangement are welded to the upper side of the section of the side member. Provision is in particular made in this respect that the parts of the connection arrangement welded to the upper side of the section of the side member are welded to the section via peripheral weld seams. The risk of rusting is reduced by such peripheral weld seams.

Provision is further advantageously made that the connection arrangement has at least one support arrangement which is arranged on the supper side of the section of the side member, with the drum support lying on a support surface of the support arrangement. The support arrangement thus provides a direct introduction of force into the side member. The support arrangement can in this respect be made as a separate element from the section of the side member. The support arrangement is, however, advantageously welded to the side member on the upper side of the section.

Provision is further advantageously made that a connection element for the connection to the drum support is fixed to the side member in a shape-matched manner by the support arrangement in the vertical direction and/or in the lengthways direction and/or in the transverse direction and/or with respect to a rotational movement about a vertical axis of rotation. Provision is in particular made in this respect that the shape-matched fixing at least permits a certain play. The flexibility of the connection arrangement is hereby increased.

The support arrangement for this purpose advantageously includes a corresponding receiver for the connection element in which said connection element is correspondingly fixable. The receiver arrangement in this respect in particular fixes the connection element at least in the vertical direction and/or in the lengthways direction.

Provision is advantageously made in this respect that the support arrangement has a receiver for the connection element into which said connection element can be inserted laterally, in particular in the transverse direction. The receiver thus fixes the connection element in the lengthways direction and has an undercut behind which a counter-element at the connection element can be pushed so that it is also fixed to the side member in the vertical direction.

The connection arrangement further advantageously includes a frame element which fixes the connection element in a shape-matched manner to the support arrangement in the lengthways direction and/or in the transverse direction and/or with respect to a rotational movement about a vertical axis of rotation. The frame element in this respect advantageously in particular fixes the connection element to the support in those directions in which the connection element is not already fixed thereto by the shape of the support arrangement. The frame element in this respect in particular fixes the connection element in a shape-matched manner at least in the transverse direction and/or with respect to a rotational movement about a vertical axis of rotation.

Provision is advantageously made in this respect that the frame element can be pushed onto a projection region of the support arrangement after the pushing of the connection element into a receiver of the support arrangement and so surrounds the connection element. An assembly is hereby made possible which is as simple as it is reliable.

Provision is further advantageously made that the support arrangement has two support elements which each have a support surface, wherein the connection element is fixed in a shape matched manner between the support elements in at least the lengthways direction. The two support elements can be welded to the side member next to one another in the lengthways direction of said side member and receive the connection element between them. The support elements in this respect advantageously each have projections under which counter-element and connection element can be pushed to fix the connection element to the support element in the vertical direction.

Provision is further advantageously made that the connection element includes a threaded bore for the screwing in of a clamping bolt. The connection element thus not only serves the shape-matched connection in the lengthways and transverse directions, but also allows, together with the clamping screw, a shape-matched connection in the vertical direction and a biasing of the drum support with the side member.

The threaded bore is in this respect advantageously arranged in a projection which passes through a cut-out in the drum support, in particular in the cross member of the drum support.

Provision is further advantageously made that the effective thread pitches of the clamping bolt are arranged in the part of the connection element loaded in tension, in particular in the region of the projection. A higher long-term strength is achieved by this embodiment as a tension nut.

Alternatively to the connection arrangement arranged on the upper side of the section of the side member, a part of the connection arrangement can also be arranged within and/or beneath the section of the side member, viewed in the vertical direction. In this respect, a screw sleeve and/or a nut can be arranged within and beneath the section of the side member.

In this respect, a cut-out is advantageously provided in the upper side of the section of the side member through which a connection element of the connection arrangement passes, in particular a clamping bolt. The cut-out is in this respect advantageously a bore.

An intermediate element is further advantageously provided via which the drum support lies on the upper side of the section of the side member. The intermediate element can in this respect in particular be made so that it establishes a shape-matching in the transverse direction and/or in the lengthways direction between the drum support and the side member. The intermediate member in particular advantageously has a first projection for this purpose with which it engages into a cut-out at the drum support. It further advantageously has a second projection with which it engages into a cut-out at the side member.

Provision is advantageously made in the truck mixer in accordance with the invention that four connection arrangements in accordance with the invention are provided for the fastening of the rear drum support to the side members of the mixer subframe. The rear drum support in this respect in particular has two transverse braces which are arranged next to one another in the lengthways direction and which are each connected to the side members of the mixer subframe via connection arrangements in accordance with the invention.

Provision is advantageously made in this respect that the total system of the four connection arrangements provides a shape-matched connection in the lengthways and transverse directions. Provision is not necessarily made in this connection that all four connection arrangements each establish a shape-matching in the lengthways and transverse directions of the vehicle. The shape-matching must rather only be ensured within the total system. Advantageously, however, each of the connection arrangements provides a shape-matching both in the lengthways and in the transverse directions.

The mixer subframe in this respect advantageously includes two side members which are connected to one another via cross members. The rear drum support further advantageously has two cross members on which the drum support means is supported.

The front drum support is likewise advantageously connected to the side members of the subframe via elastic shape-matched connections. These elastic connections do not, however, have to be made in accordance with the invention. They can rather e.g. also be welded from the outside to the side members outside the section width.

The present invention furthermore includes a mixer structure for a truck mixer as was presented above in which the rear drum support is connected or connectable to a subframe of a truck by a connection arrangement in accordance with the invention.

The present invention furthermore includes a connection arrangement for a truck mixer such as was described above. Such a connection arrangement can be used to fasten the rear drum support securely elastically and in a shape-matched manner to a subframe of a truck. The connection arrangement in this respect in particular includes a connection element which is arranged within the section width of the side member in accordance with the invention. The connection element is in this respect advantageously made as a separate component both from the side member and from the drum support. The embodiment of the connection arrangement in accordance with the invention has in this respect already been described in more detail above.

BRIEF DESCRIPTION OF THE DRAWINGS

The present invention will now be described in more detail with reference to embodiments and to drawings. There are shown.

DESCRIPTION OF THE PREFERRED EMBODIMENTS

A truck mixer in accordance with the present invention includes a base device having a chassis, wherein the base device is substantially constructed like a normal truck. The base device in this respect in particular has an operator's cabin arranged at the front, a drive motor and at least two wheeled axles via which the base device can be moved. A mixer subframe is arranged on the chassis of the base device and the mixer drum is fastened to it via front and rear drum supports. The mixer subframe in this respect includes left and right side members which are connected to one another via cross members. Cross members of the drum supports are supported on the side members. The mixer drum is in this respect rotatably supported in each case at the front drum support and at the rear drum support. In this respect, the drive motor for the rotation of the mixer drum is usually arranged at the front drum support. A roller support means for the mixer drum can e.g. be arranged at the rear drum support as well as arrangements for the filling and/or emptying of the mixer drum. The truck mixer in this respect serves the transport of liquid cement in the mixer drum.

Figure 1:
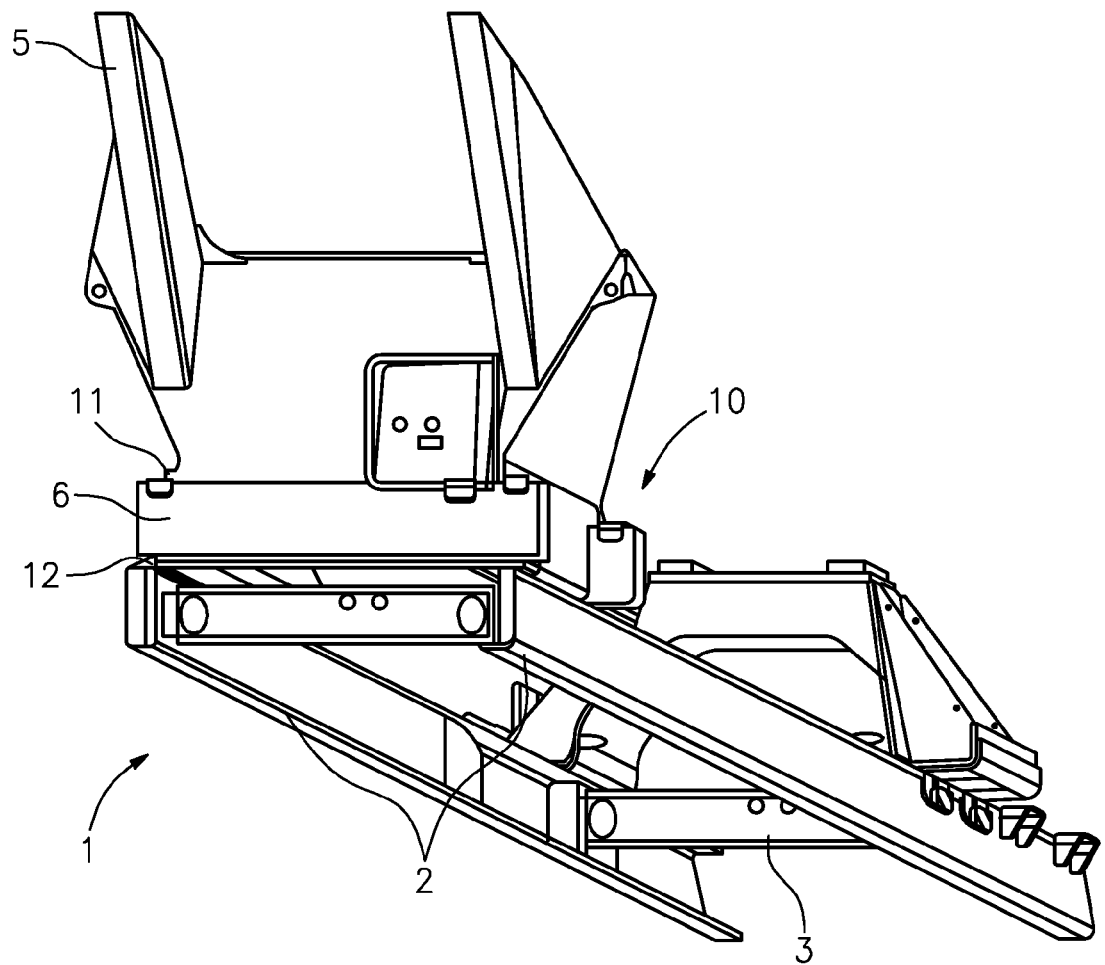
FIG. 1: an embodiment of a mixer subframe and of a rear drum support for a truck mixer in accordance with the present invention.

FIG. 1 in this respect shows a mixer subframe 1 which includes two side members 2 which are connected to one another by cross members 3. The side members are in this respect, as can also be seen from the remaining drawings, manufactured from a U-section element which is closed to form a box section by a sheet metal strip 33 in the region of the rear drum support. The U-section element is cold-formed in this respect. The base surface of the U-section in this respect forms the outer side wall 34 of the side member, whereas the upper side 30 and the lower side 31 of the side member are formed by the limbs of the U-section. The sheet metal strip 33 thus forms the inner wall of the box section. Transverse walls can furthermore be welded in the box section in the region of the connection arrangements between the rear drum support and the side member to increase the stability.

The rear drum support 5, as is shown in FIG. 1, has two cross members 6 which are each connected at their ends to the side members 2 of the mixer subframe 1. In this respect, support surfaces 7 for the installation of a roller support means for the mixer drum as well as right and left prolongations 8 for the attachment of superstructures are provided at the rear drum support 5. The rear drum support in this respect forms a cohesive weld construction.

Provision is now made in accordance with the invention that the rear drum support 5 is fastened to the side members 2 of the mixer subframe via elastic, shape-matched connections. The connection arrangements 10 used for this purpose for the shape-matched elastic connection between the rear drum support and the side members are in this respect each arranged within the section width of the side member. This has the advantage, on the one hand, that the connection forces which are introduced into the side member by the connection arrangement only generate small torsional moments. In this respect, the support surface via which the rear drum support is in each case supported on the side member is in particular also arranged within the section width of the side member. The weight force hereby introduced into the side member thus also generates no torsional moment or at least only a smaller torsional moment.

The connection arrangement and in particular the support surface is in particular arranged substantially centrally within the section width of the side member. The shape-matching in the lengthways and transverse directions is in this respect in each case provided in the embodiments by a connection element which is fixed to the side member 2 in the lengthways and transverse directions and which engages with a corresponding projection into a cut-out at the cross members 6 of the drum support 5. The support surface with which the cross members 6 lie on the side member 2 is in this respect arranged on at least two sides of this connection element. A clamping bolt 11 which only has one screw connection axis is furthermore provided for the bracing of the connection arrangement. The shape-matching is in this respect in each case made such that it does not stand in the way of a rotation of the cross member with respect to the side member about the axis of the clamping bolt. The flexibility of the connection arrangement is hereby increased.

Figure 2:
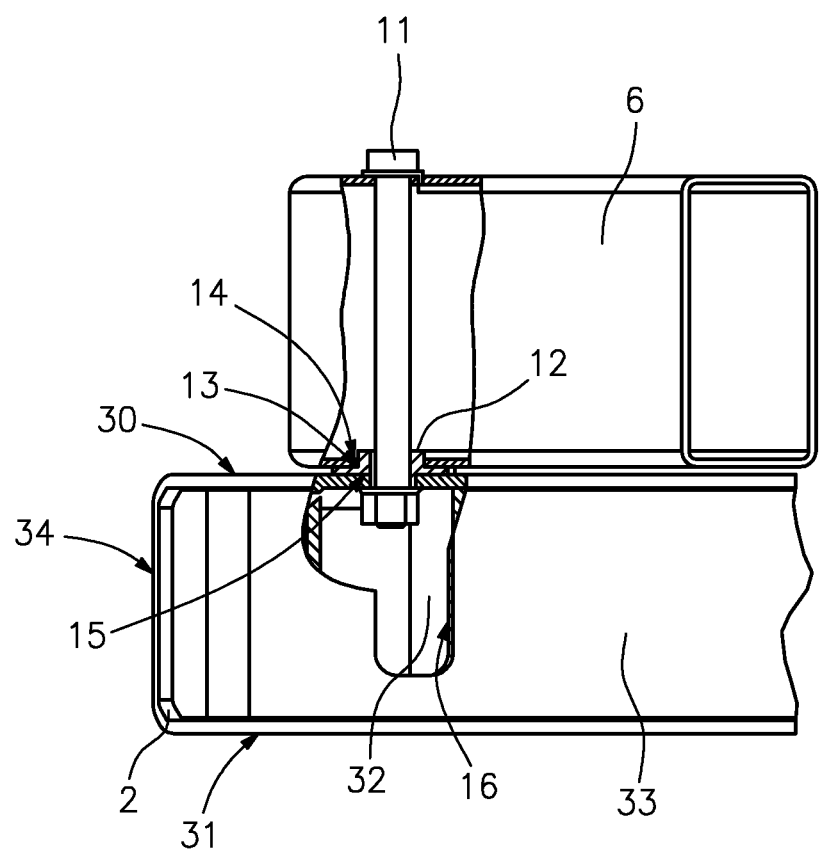
FIG. 2: a first embodiment of a connection arrangement in accordance with the invention.

In this respect, a first embodiment of a connection arrangement in accordance with the invention is used in FIG. 1 as is shown in more detail in FIG. 2. The cross member 6 of the rear drum supports in this respect lies on the side member 2 via an intermediate piece 12. The cross member 6 in this respect has a lower cut-out 14 in the region of the connection into which a first projection 13 of the intermediate piece 12 engages. The intermediate piece 12 has a second projection 15 at its lower side with which it engages into a cut-out in the upper side 30 of the side member 2. The intermediate piece 12 thus allows a shape-matched fixing of the cross member 6 at the side member 2 in the transverse and lengthways directions. The cut-out for the reception of the second projection 15 of the intermediate element is in this respect arranged substantially centrally within the section width B of the side member 2.

The projections 13 and 15 at the intermediate element 12 are in this respect each made in annular shape and engage into bores at the cross member 6 and at the side member 2. The shape-matching in the lengthways and transverse directions hereby allows a rotational movement about a vertical axis of rotation. The intermediate element 12 furthermore has a support plate which surrounds the projections 13 and 15. The cross member 6 in this respect lies on the upper side of the support plate, while the lower side of the support plate lies on the upper side 30 of the side member 2. The support surface is thus likewise arranged within the section width B of the side member 2.

A bolt 11 which is led through the cross member 6 is furthermore provided for the bracing of the connection arrangement. The bolt 11 in this respect passes through a bore in the intermediate piece 12 into the interior of the box section of the side member 2. A nut or threaded sleeve is arranged there with which the bolt 11 is screwed. This nut or sleeve is not shown in FIG. 2.

The box section has a cut-out 16 in the sheet metal strip 33 so that the nut or sleeve is more easily accessible. Optionally, a cut-out can also be provided in the lower side 31 of the side member and the nut or threaded sleeve can be introduced through it. The cross member 6 is braced with the side member 2 in the region of the connection arrangement by tightening the bolt 11.

Figure 3:
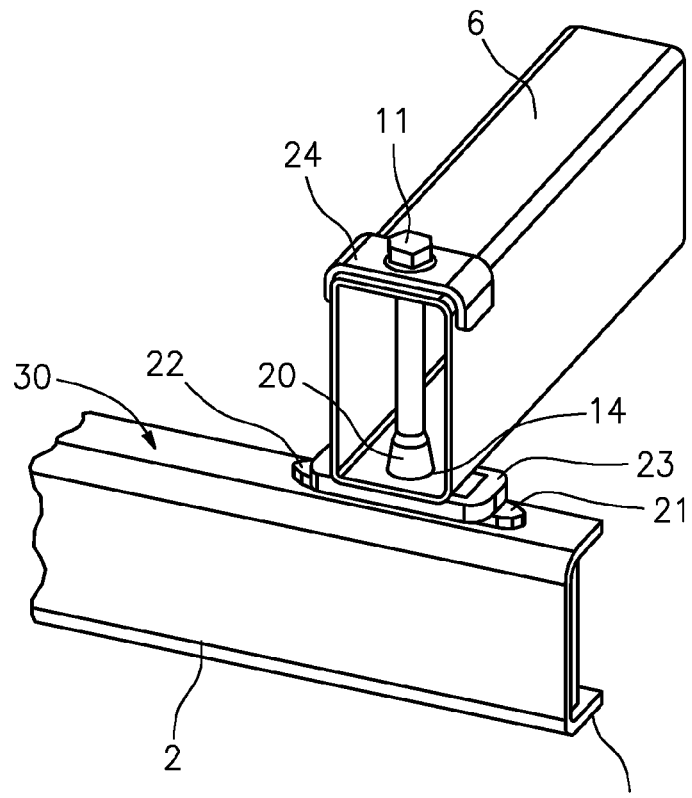
FIG. 3: a second embodiment of a connection arrangement in accordance with the invention in a perspective view.

In FIG. 3, a second embodiment of a connection arrangement in accordance with the invention is now shown. It is arranged completely on the upper side of the side member 2. In this respect, support parts 21 and 22 are provided which are each welded to the upper side 30 of the side member 2. Peripheral weld seams are used for this purpose to avoid rust problems. The contact parts in this respect have support surfaces at their upper side on which the cross member 6 is supported at its lower side.

A connection element 20 is furthermore fixed in a shape-matched manner in the lengthways direction and in the vertical direction at the support parts 21 and 22. The connection element 20 in this respect establishes the shape-matched connection to the cross member.

Figure 4A:
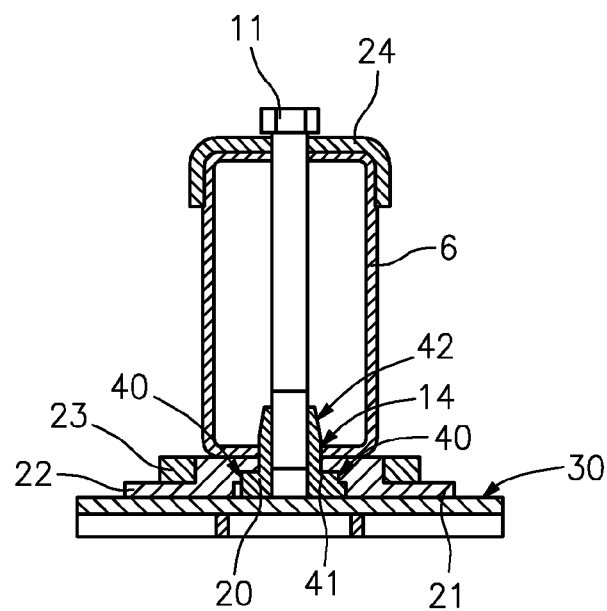
FIG. 4a: the second embodiment of a connection arrangement in accordance with the invention in a sectional view along the lengthways direction of the side member.
Figure 4B:
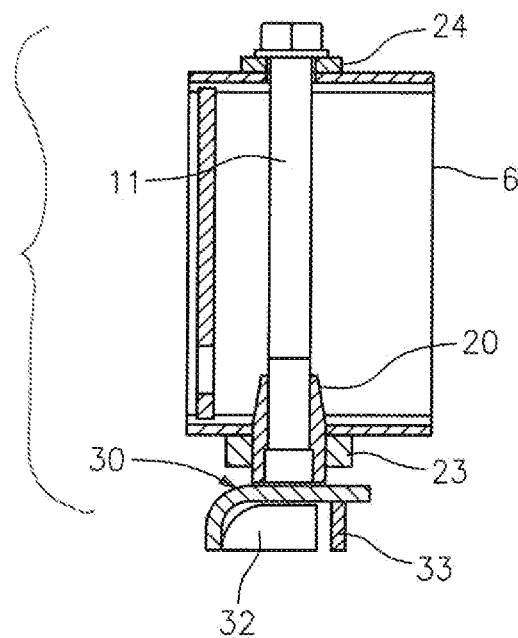
FIG. 4b: the second embodiment of a connection arrangement in accordance with the invention in a sectional view in the transverse direction of the side member.

The two receiver elements 21 and 22 in this respect form a receiver into which the connection element can be laterally inserted. As can easily be recognized in FIG. 4, the two receiver elements 21 and 22 in this respect have projections 40 which form an undercut in the vertical direction. The connection element 20 can therefore be inserted laterally between the two support elements 21 and 22 so that a projection 41 of the connection element 20 is supported at the projections 40 of the support parts 21 and 22 in the vertical direction. The connection element 20 is likewise held between the two support parts 21 and 22 in a shape-matched manner in the lengthways direction.

The shape-matching in the transverse direction is, in contrast, established by a frame element 23 which is pushed onto the support parts 21 and 22 from above after the pushing in of the connection element 20. The frame element in this respect surrounds the support surfaces and the connection element 20 disposed therebetween. The connection element is hereby fixed at the frame element in the transverse direction. In addition, the connection element 20 is fixed with respect to rotations about a vertical rotational axis at the frame element.

The connection element 20 has a projection 42 with which it passes through a bore 14 at the lower side of the cross member 6. The cross member is hereby fixed at the side member 2 in the transverse and lengthways directions. The projection is in this respect rotationally symmetrical so that it does not stand in the way of a rotational movement about a vertical axis of rotation. The projection 42 is in this respect made conical for the easier setting on of the cross member 6.

A bolt 11 which is led through the cross member 6 is again provided for the bracing of the connection arrangement. In this respect, a clamp 24 is provided at the upper side which provides a better introduction of force into the cross member 6. The connection element 20 has a threaded bore into which the clamping bolt 11 is screwed. The threaded bore is in this respect arranged in the projection 42. In the embodiment, the threaded bore in this respect completely passes through the connection element 20. The connection element is in this respect advantageously made as a tension nut, that is, the effective thread pitches of the tension bolt 11 are disposed in the part loaded in tension, that is, in the projection 42. A higher long-term strength is hereby achieved.

Figure 5A:
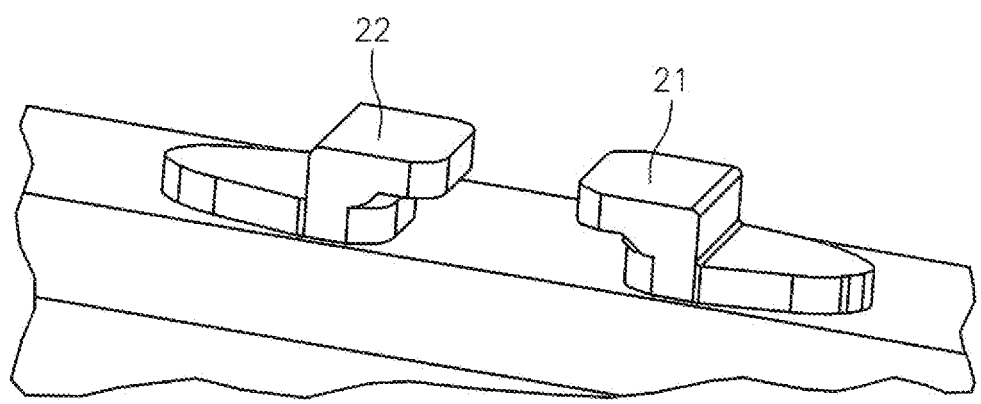
FIGS. 5a-5c: the establishing of a connection between a side member and the rear drum support in accordance with the second embodiment in the present invention.
Figure 5B:
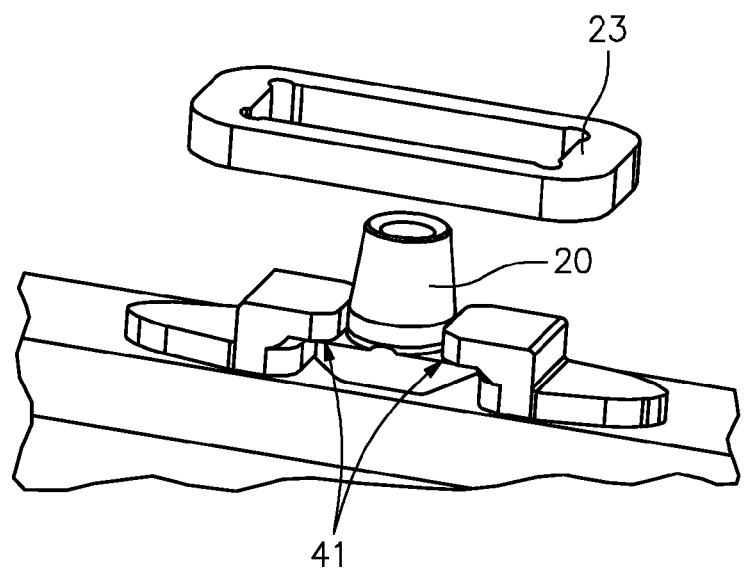
Figure 5C:
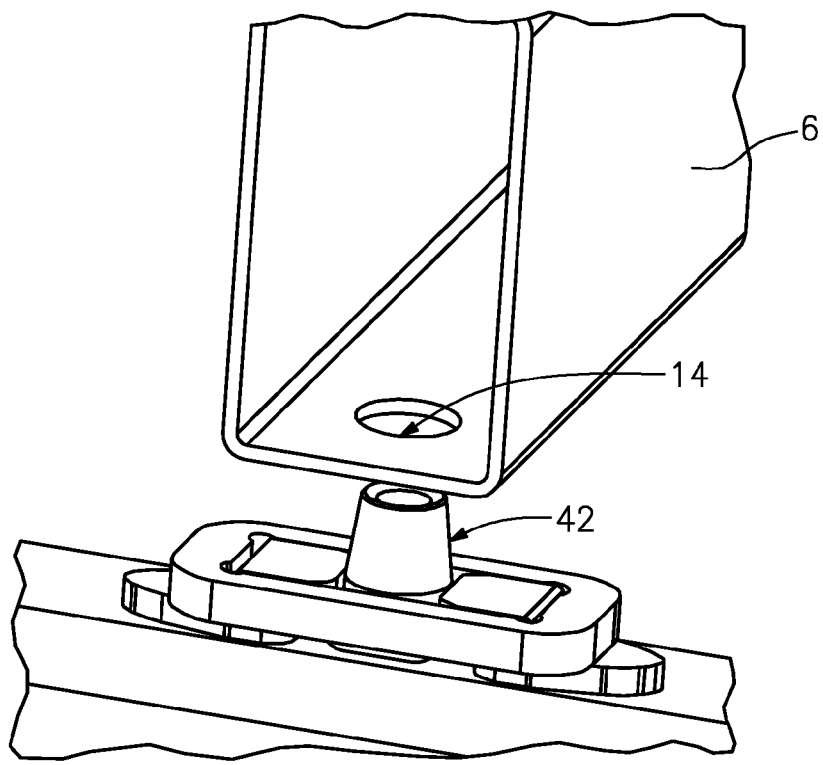

The installation of the cross member at the side member is shown again in three steps in FIGS. 5a to 5c. In this respect, the two support parts 21 and 22 are first welded to the upper side of the side member. The connection element 20 is thereupon laterally inserted into the receiver between the two support parts 21 and 22 so that it is fixed in shape-matched manner thereto in the lengthways direction and in the vertical direction. The frame element 23 is thereupon pushed onto the support parts 21 and 22 from above and surrounds the support surfaces of the support parts and of the connection element 20. The connection element is hereby fixed in the transverse direction and with respect to rotational movements. A bore 14 at the lower side of the cross member is now placed onto the projection 42 at the connection element 20. The clamping bolt 11 is now screwed into the connection element 20 as is e.g. shown in FIGS. 3 and 4.

In the present invention, a stress bolt and/or a headless bolt is used. This is less expensive and easier to handle than a strap bolt such as was used in the prior art. In this respect, a stress bolt is advantageously used since such a bolt has better properties in long-term strength.

The contact surfaces between the supports and the drum support or between the supports and the side member can furthermore be made spherical. No additional stress forces thereby result due to angular movements between the subframe and the drum support either. Stress peaks due to edge pressure are thus avoided.

Since four fastening points are present at the rear drum support in the embodiment shown, the system can be made so that a shape matching is not present at all four points in the lengthways and transverse directions of the vehicle, but the shape matching is ensured within the total system.

In addition to the better introduction of force, the connection arrangement in accordance with the invention moreover makes it possible to make the drum support so short that its outer dimensions project only a little, or not at all, beyond the lateral edge of the subframe of the truck mixer and thus also of the truck frame.

In addition to the improved introduction of force, the installation situation is thus also improved, in particular when disturbing edges at the base device have to be considered.

The invention claimed is:

1. A connection arrangement for a truck mixer having a chassis, a mixer subframe (1) arranged on the chassis and a mixer drum arranged over a front drum support and a rear drum support (5) on the mixer subframe (1), and wherein the mixer subframe (1) comprises side members (2), the connection arrangement having, elastic, shape-matched connections (10) arranged for fastening at least the rear drum support (5) on the side members (2), with at least one of the elastic, shape-matched connections (10) arranged within a section width of a respective side member (2) to which the elastic, shape-matched connection (10) is fastened, said at least one connection (10) having at least one support arrangement (21, 22) situated on an upper side (30) of the respective side member (2) and in turn having a support surface on which the drum support (5) lies, a connection element (20) arranged for connection to the drum support (5) being affixed in shape-matched manner to the support arrangement (21, 22) in at least one of a vertical direction, a longitudinal direction of the side member (2), a transverse direction of the side member (2), and with respect to rotational movement about a vertical axis thereof, and the support arrangement (21, 22) having an area for laterally receiving the connection element (20) being slid or pushed thereinto.

2. A truck mixer having a chassis, a mixer subframe (1) arranged on the chassis and a mixer drum arranged over a front drum support and a rear drum support (5) on the mixer subframe (1), the mixer subframe (1) comprising side members (2), elastic, shape-matched connections (10) arranged for fastening at least the rear drum support (5) on the side members (2), with at least one of the elastic, shape-matched connections (10) arranged within a section width of a respective side member (2) to which the elastic, shape-matched connection (10) is fastened, said at least one connection (10) having at least one support arrangement (21, 22) situated on an upper side (30) of the respective side member (2) and in turn having a support surface on which the drum support (5) lies, a connection element (20) arranged for connection to the drum support (5) being affixed in shape-matched manner to the support arrangement (21, 22) in at least one of a vertical direction, a longitudinal direction of the side member (2), a transverse direction of the side member (2), and with respect to rotational movement about a vertical axis thereof, and the support arrangement (21, 22) having an area for laterally receiving the connection element (20) being slid or pushed thereinto.

3. A truck mixer in accordance with claim 2, wherein the connection (10) is situated entirely within a transverse width of the respective side member (2).

4. A truck mixer in accordance with claim 2, wherein a support surface at the drum support (5) and the connection element (20) is spherical.

5. A truck mixer in accordance with claim 2, wherein the connection element (20) comprises a cutout or bore (14) and the drum support (5) in turn comprises an opening through which the connection element (20) extends.

6. A truck mixer in accordance with claim 5, wherein the connection (10) farms part of a bracing arrangement for the rear drum support (5) on the side member (2).

7. A truck mixer in accordance with claim 6, additionally comprising a clamping bolt (11) passing through the respective cutout/bore (14) in the connection element (20) and opening in the drum support (5).

8. A truck mixer in accordance with claim 2, wherein the support arrangement (21, 22) is welded to the upper surface (30) of the respective side member (2).

9. A truck mixer in accordance with claim 2, wherein the support element comprise projections (40), and additionally comprising a frame element (23) arranged for fixing the connection element (20) to the support arrangement (21, 22) by being pushed or inserted onto the projections (40) from above, after the support element (20) is slid or pushed into the support arrangement (21, 22).

10. A truck mixer in accordance with claim 2, wherein the support arrangement (21, 22) comprises two separate receiver elements (21, 22) defining the receiving area therebetween.

11. A truck mixer in accordance with claim 2, wherein the connection element (20) includes a projection (42) passing through a cutout in the drum support (5) and threaded bore (14) arranged in said projection (42), and additionally comprising a clamping bolt (11) arranged to be screwed into the threaded bore (14), with thread pitches arranged in the threaded bore (14) in a part of the connection element (20) to be loaded in tension.

12. A truck mixer in accordance with claim 11, wherein the thread pitches are arranged in the threaded bore (14) in the vicinity of the projection (42).

13. A truck mixer in accordance with claim 12, comprising four said connections (10).

14. A truck mixer in accordance with claim 7, additionally comprising a clamp (24) arranged to clamp the bolt (11) the drum support (5) at an end opposite the connection element (20).

15. A truck mixer in accordance with claim 10, wherein
- each said receiver element (21, 22) comprises a projection (40) defining an undercut in the vertical direction,
- the connection element (20) comprises a projection (41) arranged to mate with the projections (40) of the receiver elements (21, 22) when slid or pushed into the receiving area defined between the receiver elements (21, 22) and to be retained therein in shape-matched fashion,
- the rear drum support (5) is in the shape of a hollow cross member (6) having through-openings at opposite ends thereof,
- the connection element (20) has a further projection (42) arranged to extend through one of the through-openings in the hollow cross member (6) through which a bore (14) extends,
- a frame (23) is arranged to seat over both receiver elements (21, 22) and the connection element (20) after the connection element (20) is slid or pushed between the receiver elements (21, 22),
- a bolt (11) is arranged to be inserted through the other through-opening in the hollow cross member (6) and into the bore (14) of the connection element (20), and
- a clamp (24) is arranged to seat around the bolt (11) adjacent the other through-opening in the hollow cross member (6) and be secured to the bolt (11) and cross member (6),
- such that the cross-member (6) is secured to the side member (2) in both transverse and longitudinal directions and permitting rotation about a vertical axis.

16. A truck mixer in accordance with claim 15, wherein the further projection (42) of the connection element (20) is conically-shaped.

17. A truck mixer in accordance with claim 15, additionally comprising cross members (3) interconnecting the side members (2).

\* \* \* \* \*